United States Patent [19]
Barton

[11] Patent Number: 5,520,220
[45] Date of Patent: May 28, 1996

[54] ACCESS MOUNTING FLANGE FOR COLD TEMPERATURE CHEMICAL PROCESSING EQUIPMENT

[76] Inventor: David D. Barton, P.O. Box 728, Bellaire, Tex. 77402

[21] Appl. No.: 520,489

[22] Filed: Aug. 29, 1995

[51] Int. Cl.⁶ ............................................. F16L 55/10
[52] U.S. Cl. ........................... 138/92; 138/94; 215/355; 220/307
[58] Field of Search ................. 138/92, 90, 94, 138/89, 149; 215/355, 296, 354; 220/254, 352, 256, 307

[56] References Cited

U.S. PATENT DOCUMENTS

| | | | |
|---|---|---|---|
| 781,408 | 1/1905 | DuBois | 215/231 |
| 2,559,210 | 7/1951 | Bradley | 29/287 |
| 3,756,287 | 9/1973 | Bishop | 138/92 |
| 3,773,086 | 11/1973 | Kurz | 138/92 |
| 3,827,462 | 8/1974 | Celesta | 138/90 |
| 3,940,308 | 2/1976 | Blanchfield | 138/92 X |
| 4,091,842 | 5/1978 | Greenawalt et al. | 138/90 |
| 4,290,536 | 9/1981 | Morel | 220/359 |
| 5,010,926 | 4/1991 | Kurth et al. | 138/92 X |
| 5,014,866 | 5/1991 | Moore | 138/92 X |
| 5,351,718 | 10/1994 | Barton | 138/92 |

*Primary Examiner*—Patrick Brinson
*Attorney, Agent, or Firm*—Pravel, Hewitt, Kimball & Krieger

[57] ABSTRACT

An apparatus is provided for an access port through an insulative coating or vapor barrier wrap on tubing in cold chemical processes. The apparatus seals against entry of vapors and moisture into the access port which might accumulate there and freeze, causing ice build-up and preventing access of testing probes to the tubing. The apparatus also has an insulative effect against transfer of external ambient heat through its structure to the tubing.

17 Claims, 3 Drawing Sheets

ACCESS MOUNTING FLANGE FOR COLD TEMPERATURE CHEMICAL PROCESSING EQUIPMENT

BACKGROUND OF INVENTION

1. Field of Invention

The present invention relates to access mounting flanges for tubing, containers or vessels used in chemical processing at relatively cold temperatures.

2. Description of Prior Art

It has been conventional practice in chemical processing to cover containers and pipe walls with coatings of foam or other insulative materials. Normally, these materials have been covered within protective jackets or covers. For reasons of safety and also environmental protection, it has been required to periodically inspect or monitor the walls of these containers or pipes. For this reason, access ports or holes have been drilled or otherwise formed in the insulation to provide access through the insulation to the wall.

U.S. Pat. No. 5,351,718, of which applicant is inventor, relates to an access plug flange assembly which is adapted to be fitted into insulative coverings for chemical processing equipment. Structure according to applicant's prior U.S. Patent has proven useful in a wide variety of situations with chemical processing equipment insulative coverings. However, where the processing involved relatively cold applications (typically −40° F. or lower) several additional problems have still existed.

The normal protective vapor barrier coating around the insulation on the metal tube or vessel wall had to be removed at the test location, leaving an air path through the vapor barrier. Ambient air entering these access plug flanges was generally considerably warmer than the processing temperatures of the cold processing equipment. It also contained moisture due to the general presence of atmospheric humidity. The moisture in the relatively warm ambient air generally froze on the cold metal equipment walls within prior access plug flanges on processing equipment. As a result, a plug or body of ice formed within the flange on the equipment wall. In order for accurate test readings to be obtained in the flange, the ice had to be removed so that the test probe actually contacted the equipment wall.

This usually required that the ice be chipped away, which was a time consuming process. Further, either the insulation or the equipment wall, or both, could be damaged during such chipping. If readings were made without removing the ice, they were erroneous and of no value. Also, in processing equipment which cycled above and below cold temperatures, the ice could melt and the resulting liquid within the flange could penetrate the insulative coating and damage it. The liquid which penetrated into the insulative coating could then refreeze, hampering the effectiveness of the insulation for its intended purpose. The liquid also could refreeze inside the flange, again forming an undesirable block or plug. Presence of the frozen liquid in the flange also made it difficult to remove an installed plug flange without damaging both the flange assembly and the insulative coating.

SUMMARY OF INVENTION

Briefly, the present invention provides a new and improved access mounting flange assembly for sealing an inspection port in insulation covering on cold temperature chemical process equipment. The access mounting flange assembly includes a collar for fitting in an outer portion of the inspection port and vapor barrier in the insulation covering. A tubular saddle is mounted on a wall of the equipment in the inspection port beneath the collar to receive the collar within the insulation covering. The collar and tubular saddle define an access passage of the inspection port through the vapor barrier insulation covering to the equipment wall for testing purposes.

A flange which is insertable into the collar serves as an air tight receiving member of the access mounting flange assembly. A sealing plug is inserted into the flange to seal it, while a closed cell insulative stopper is mounted within the access passage below the sealing plug to prevent atmospheric moisture from contacting the equipment wall and freezing on it to form an ice plug or block. The flange assembly can be mounted on an external surface of the insulation covering and vapor barrier by a band or strap, enhanced by an elastomer or silicone seal held under compression by the band or strap or it may be attached by fastener or connector screws or other suitable mounting structure.

DESCRIPTION OF PREFERRED EMBODIMENT

Figure 1:
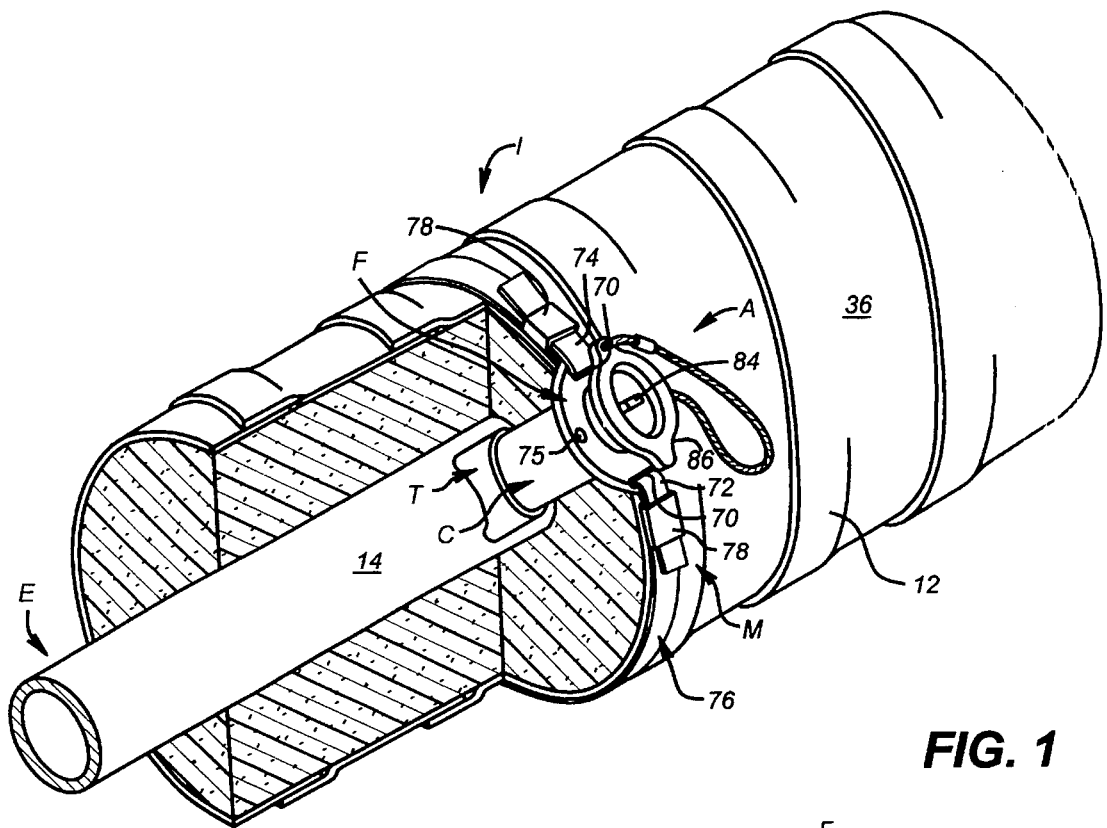
FIG. 1 is an isometric view, taken partly in cross-section, of an access mounting flange according to the present invention mounted on cold chemical processing equipment.
Figure 2:
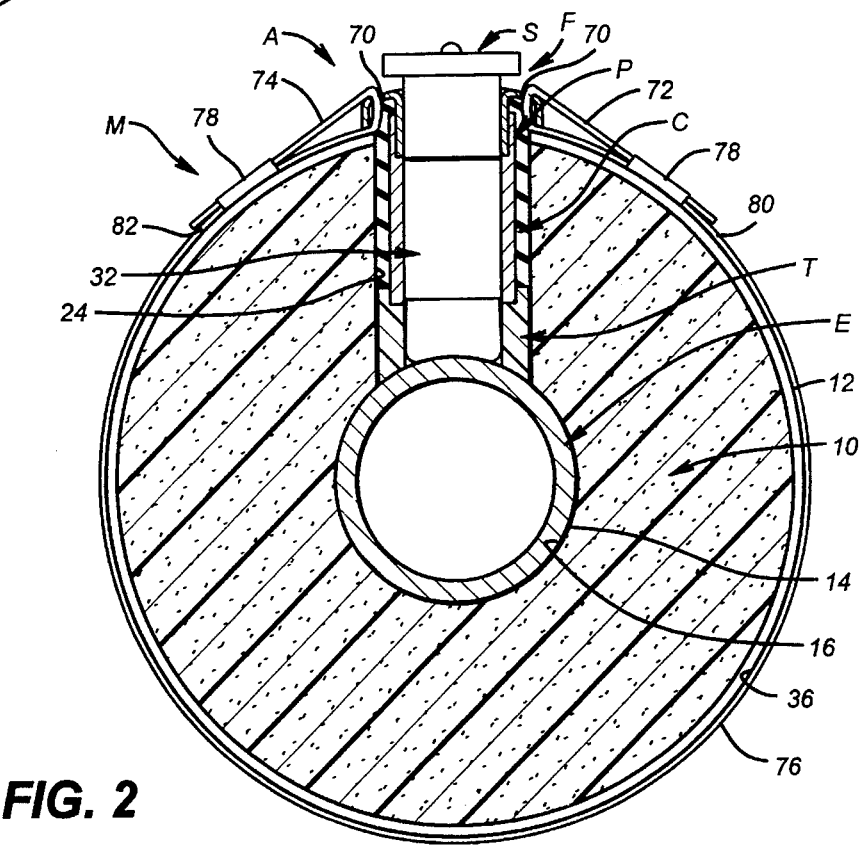
FIG. 2 is an elevation view, taken partly in cross-section, of a flange assembly according to the present invention.

In the drawings, the letter A designates generally an access mounting flange assembly for sealing a port P in an insulative covering I, usually an insulative material 10 located within an outer covering or vapor barrier 12. The insulative material 10 is applied over an outer surface 14 of a wall 16 of a conventional item of cold temperature chemical processing equipment E, such as a vessel. The vapor barrier 12 may be applied to the insulative material 10 by being wrapped or otherwise suitably covered with a mastic or the like. As used in the present invention, the term equipment is intended to refer to vessels, containers or other types of equipment used in the cold temperature chemical processing systems, as well as pipes, tubing or conduits connecting such equipment.

Cold temperature according to the present invention refers to temperature ranges significantly below ambient temperature so as to condense and freeze moisture from ambient air on either the equipment surface or within the insulation 10 where the vapor barrier 12 has been removed or broken. Typical ranges of cold temperature equipment might be, for example, about −40° F. or below, extending to even cryogenic temperatures.

Figure 4:
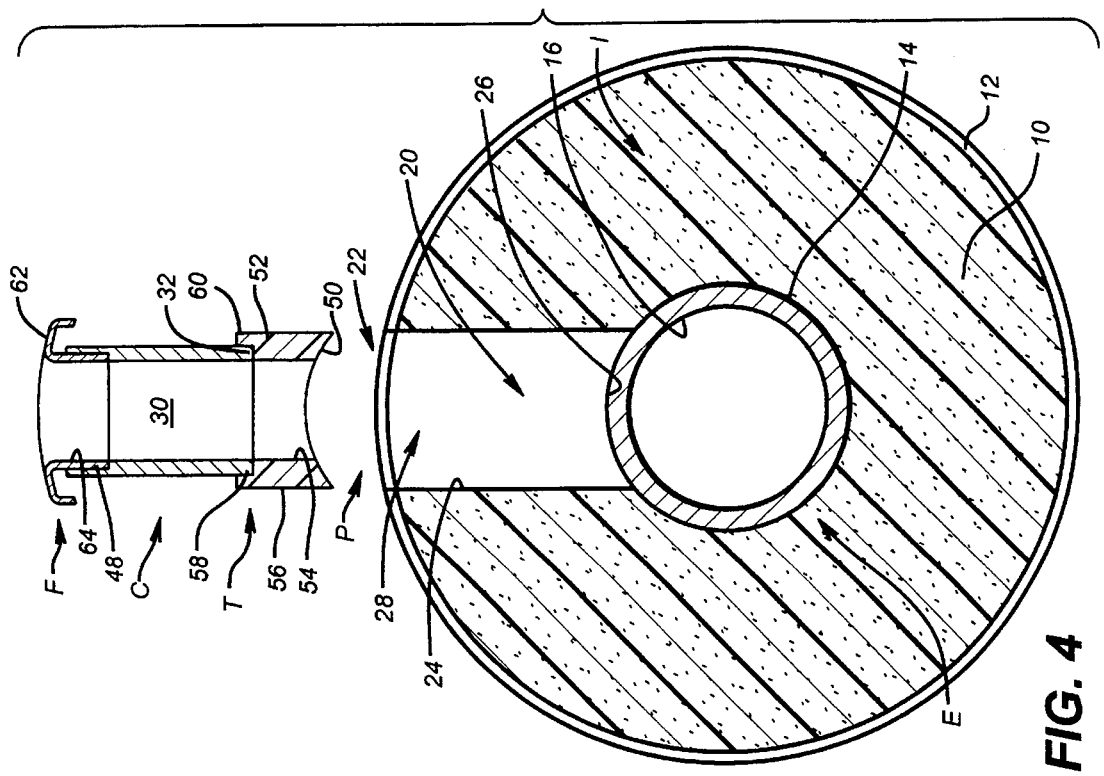
FIGS. 4 and 6 are partially exploded elevation views, taken in cross-section, of the flange assembly of FIG. 2 during other stages of its installation on a cold chemical processing tube.
Figure 5:
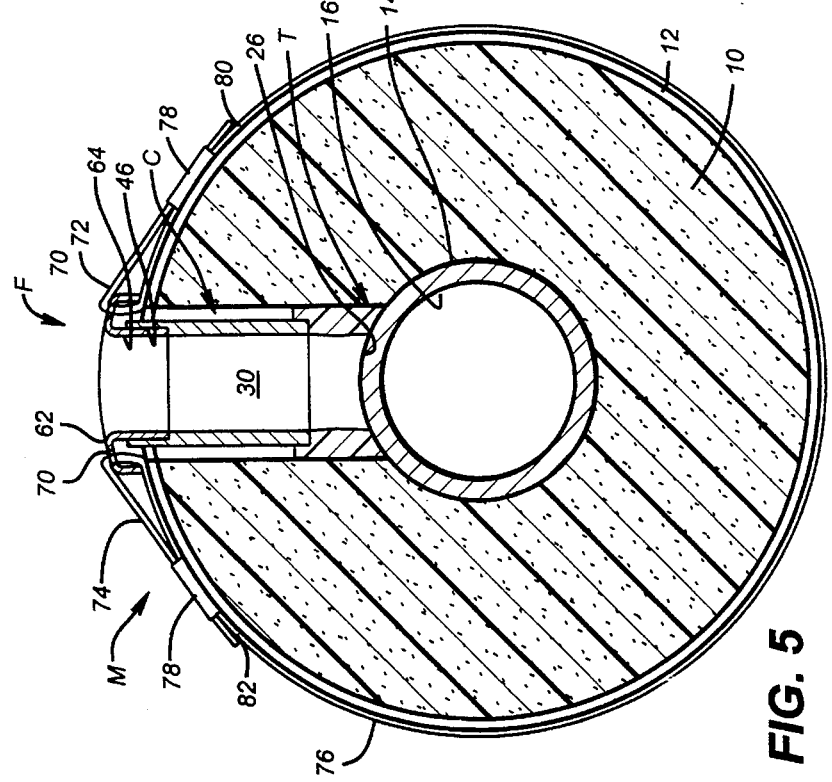

The port P is generally a cylindrical opening or pre-cut passage 20 (FIG. 4) formed extending inwardly from a circular hole 22 cut in the vapor barrier jacket 12. The hole 22 extends through a cylindrical side wall 24 in the insulative material 10 to an external surface 26 of the vessel wall 16. When the port P is open (FIG. 5) through the assembly A, access for inspection or test probes or other test equipment to the surface 24 is provided. The vapor barrier coating or wrap 12 on the outside surface of insulation 10 has been removed above the cylindrical opening 20 so that test probes or equipment may have access and contact with the wall 16.

The access mounting flange assembly A according to the present invention includes a collar C which fits in an outer portion 28 of the inspection port P in the insulative covering I. A tubular saddle T is mounted on the wall 16 of the equipment in the inspection port P beneath the collar C to receive the collar C within the insulative material 10. The collar C and the saddle T define an access passage 30 through the vapor barrier 12 and insulative covering 10 to the equipment wall 16 for testing purposes.

A flange F is insertable into the collar C to serve as a receiving member for a sealing plug S. The sealing plug S is adapted to be inserted into the flange F for sealing the flange and consequently the access passage 30. An insulative closed cell stopper 32 is mountable within the access passage 30 below the sealing plug S in order to prevent moisture from contacting the equipment wall 16 and freezing the wall 16 to a minimum. The flange F is mounted on the vapor barrier 12 over the insulation covering 10 and at an external surface 36 of jacket 12 by means of a mounting mechanism M.

Figure 3:
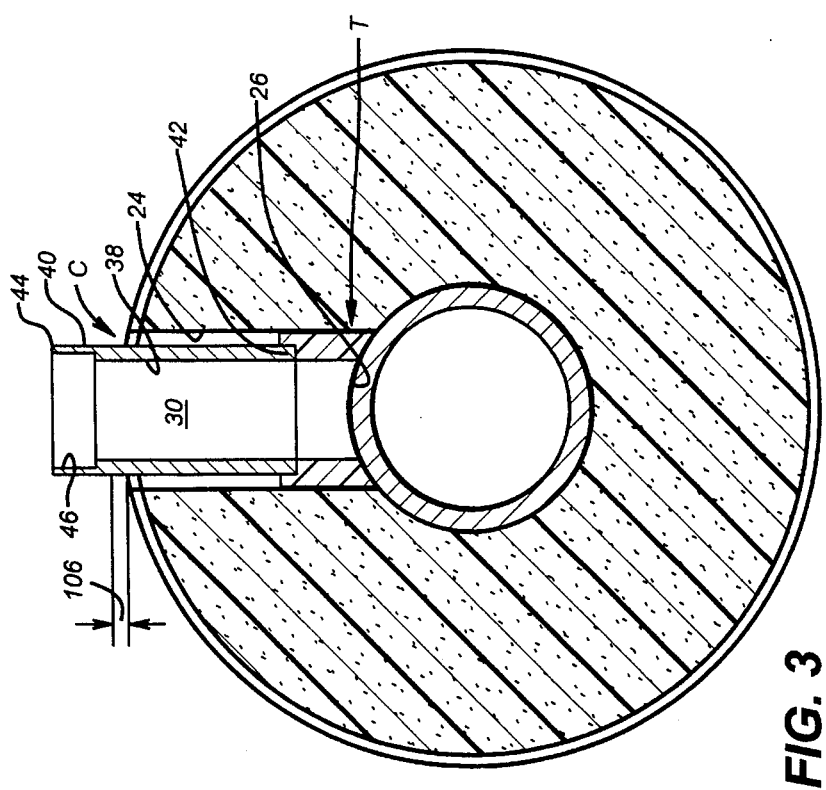
FIGS. 3 and 5 are elevation views, taken in cross-section, of the flange assembly of FIG. 2 during certain stages of its installation on a cold chemical processing tube.
Figure 6:
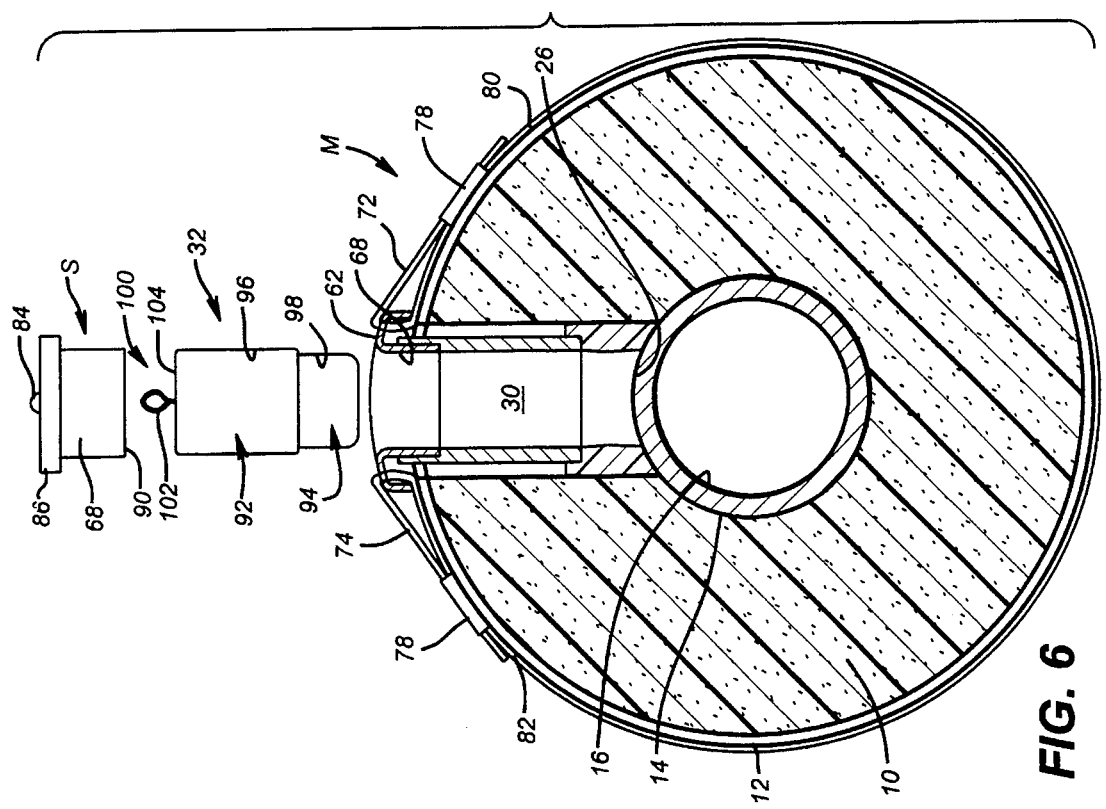

The collar C is a tubular member with a generally cylindrical inner wall 38 (FIG. 3) and outer wall 40 extending from an inner end 42 to an outer end 44. The collar C is made from a suitable strength material such as aluminum, steel, or the like. The outer wall 56 of the saddle T is adapted to snugly fit against the side wall 24 of the insulative foam 10. A portion of the inner wall 38 of the collar C has been removed by counterboring adjacent a surface 46 extending inwardly within the outer end 44 to define a socket for receiving a downwardly extending sleeve member 48 (FIG. 4) of the flange F. If desired, the surface 46 may be tapered outwardly from bottom to top a slight amount (5° or 10°) and the sleeve member 48 may also be tapered to a corresponding and matching degree. Selected lengths of the inner end 42 of the collar C may be removed during installation to insure proper fitting of the collar C within the port P as will be set forth.

The tubular saddle T is a generally cylindrical body formed of a resilient, insulative rubber or synthetic resin. For example, the tubular saddle T may be molded or otherwise formed of a butyl rubber for moderate cold temperature applications (in the range of −40° or above) or so. For even colder temperature ranges below this level, the saddle may be formed from a silicone rubber, if desired. It should be understood that other materials than butyl rubber or silicone rubber may also be used.

The tubular saddle T has a lower surface 50 conforming to the curved cylindrical outer wall 26 of the equipment E on which the saddle T is to be mounted. If desired, grooves may be formed in the surface 50 to receiving a silicone gel or other sealing material for vapor sealing purposes. A cylindrical body portion 52 of the tubular saddle T extends upwardly from the lower surface 50 between an inner wall 54 and an outer wall 56. An annular groove or socket 58 is formed in an upper end portion 60 of the saddle T to receive and firmly engage the inner end 32 of the collar C. The resilient material of the saddle S and the firm engagement of the collar C in the groove 58 form a vapor barrier at their juncture. Further, the lower surface 50 of the saddle T is firmly urged into engagement with the wall 16 by the mounting mechanism M during installation of the assembly A, as will be set forth.

The flange F is preferably formed from a suitable strength metal, having a collar member 62 integrally formed with the sleeve member 48. The sleeve member 48 is adapted to snugly fit along an outer surface 64 (FIG. 4) against the surface 46 (FIG. 3) formed by counterboring in the collar C. The sleeve member 48 may also be slightly tapered along an inner wall 66 to allow firm engagement of side walls 68 of the sealing plug S.

The collar member 62 of the flange F may be of like construction to that of applicant's prior U.S. Pat. No. 5,351,718, which is incorporated by reference for all purposes. A silicone sealant elastomer material may be injected or otherwise placed in the spaces or voids beneath the collar member 62 as disclosed in this prior patent. The sealant when so placed could also be used, if desired, to fill any spaces between insulative material 10 and the collar C. The silicone material when used as an adhesive below collar member 62 provides a further vapor seal against moisture which might enter the insulation 10 and freeze. With silicone under the collar member 62, it is put into compression by the attachment M, further enhancing the vapor barrier effect. The collar member 62 has a pair of diametrically opposed passage slots 70 formed therein for receipt and passage of opposite ends 72 and 74 of an attachment strap or belt 76 of the attachment mechanism M. The end portion 72 and 74 of the attachment strap 76 are inserted upwardly through the passage slots 70. Thereafter, the end portions 72 and 74 are drawn away from the collar member 62 until the flange F is firmly in place on the jacket 12 thus putting the resilient saddle T in compression with the pipe outer surface 26. Binder bands or tapes 78 are attached to hold the end portions 72 and 74 in position against intermediate portions 80 and 82, respectively, of the belt 76. It should be understood that the collar member 62 may also have a suitable number of guide sleeves 75 of the type set forth in applicant's U.S. Pat. No. 5,351,718. Connector or attachment screws of the type set forth in this patent may be used in addition to the belt 76 of the attachment mechanism M. Alternatively, connector screws of this type may be used as a substitute for the belt 76 and function in the place of the belt 76 as an attachment mechanism M. Also, the sealant material or elastomer when injected into the space below the collar 62 for sealing purposes as discussed above also adheres to the jacket 12 binding the collar member 62 to the insulative covering I for attachment purposes.

The sealing plug S may be of the type disclosed in applicant's prior United States patent, having a gripping tab 84 and a sealing lip 86 formed at upper portions from the side wall member 68 above a barrier wall 90. It should be understood, however, that other forms of movable sealing plugs which are adapted to firmly seal and function as a vapor barrier within the flange F may also be used, as well as other flange configurations.

The insulative stopper 32 is a cylindrical stopper or barrier member including an upper stopper portion 92 and a lower stopper portion 94, each formed from a closed-cell foamed synthetic resin, such as that sold under the trademark Ethafoam, to prevent air entry into the port P when the stopper 32 is in place. The stopper 32 also serves as a volumetric displacement member, functioning to force ambient air from passage 30 when inserted into it.

The upper portion 92 of the stopper 32 is of an outside diameter slightly greater than the inside diameter of the inner wall 38 of the collar C and has a side wall 96 adapted to seal against the inner wall 38 of the collar C. The lower portion 94 of the stopper 32 is of an outside diameter slightly greater than the inside diameter of the inner wall 54 of the saddle 50, along a side wall 98, also for sealing purposes against the body 52 of the saddle T. In this manner, ice is prevented from forming even should an equipment leak occur, due to the presence of the sealing plug, saddle T and stopper 32 and their interfitting relationship.

A retrieval cord 100 of suitable strength synthetic resin is secured within the stopper 32, having an upper loop portion 102 extending above an upper surface 104 of the stopper 32. In this manner, an operator may easily grip the retrieval cord 100 at the loop portion 102 to pull and remove the stopper 32 by overcoming the sealing forces.

In the operation of the present invention, the saddle T and collar C are connected together and inserted into the passage 20 (FIG. 3) until surface 50 of saddle T rests on the surface 26 of equipment E. Should the collar C be longer than required, as indicated by a space 106, an amount corresponding to this space may be removed from the lower end 42 of collar C.

After the collar C is of the proper length, the flange F is fitted in outer end 44 (FIG. 4), and the assembled collar, flange and saddle are inserted into the passage 20. The surface 50 of the saddle T is resting on the surface 26 of equipment E. The mounting mechanism M (FIG. 5) is then connected, holding the assembled collar, flange and saddle firmly in compression against the equipment E. As has been noted above, the compressive forces so exerted form a vapor barrier.

A suitable desiccant material or one such as propylene glycol with freeze-resistant characteristics may be sprayed or otherwise applied on surface 26 and stopper 32 is inserted into passage 30. Propylene glycol is especially suitable because it is biodegradable and non-toxic, since it has also been used as a food preservative. As the stopper 32 is inserted, air in passage 30 is forced outwardly, helping keep the interior of inspection port P free from moisture. After the stopper 32 is properly positioned, the sealing plug S is then urged into place in flange F above the stopper 32. The flange assembly A once installed in this manner keeps the inspection port P free from moisture which might otherwise accumulate and freeze on the cold temperature equipment C.

When it is necessary to inspect or test the equipment E at port P, the plug S and stopper 32 are removed. Further propylene glycol, freeze-resistant material or desiccant may be added sprayed in the passage 30 as required during inspection or before re-insertion of the stopper 32 and sealing plug S.

It should be understood that for equipment which is only moderately cold, at temperatures above about −40° F. an access plug flange like that of U.S. Pat. No. 5,351,718 without a collar and saddle may be used. A plug flange of this type can be held in place by screws, silicone elastomer or by releasable connectors such as shown at 78 in the drawings of the present application. If desired, circular vapor barrier bands or disks may be spaced from each other along tubular equipment being insulated, defining a cylindrical volumetric area about the test point where the access plug flange is to be located.

Having described the invention above, various modifications of the techniques, procedures, material and equipment will be apparent to those in the art. It is intended that all such variations within the scope and spirit of the appended claims be embraced thereby.

I claim:

1. An access mounting flange assembly for sealing an inspection port in insulative covering on cold temperature chemical process equipment, comprising:

a collar for fitting in an outer portion of the inspection port in the insulative covering;

a tubular saddle for mounting on a wall of the equipment in the inspection port beneath said collar to receive same within the insulative covering;

said collar and said tubular saddle defining an access passage through the insulative covering to the equipment wall for testing purposes;

a flange insertable into said collar to serve as a receiving member;

a sealing plug for insertion into said flange for sealing said flange;

an insulative stopper mountable within said access passage below said sealing plug for preventing moisture from contacting the equipment wall and freezing; and means for mounting said flange on an external surface of the insulative covering.

2. The flange assembly of claim 1, wherein:

said tubular saddle is a cylindrical member formed from a thermal insulative material.

3. The flange assembly of claim 2, wherein:

said tubular saddle is formed from a butyl rubber.

4. The flange assembly of claim 2, wherein:

said tubular saddle is formed from a silicone rubber.

5. The flange assembly of claim 1, wherein:

each of said collar and tubular saddle are cylindrical members.

6. The flange assembly of claim 5, wherein:

said tubular saddle has an annular groove formed about an upper portion for receiving a lower end portion of said collar.

7. The flange assembly of claim 1, wherein:

said flange has an outwardly extending rim formed thereon for connection with said mounting means.

8. The flange assembly of claim 7, wherein:

said sealing plug has an outwardly extending lip formed for sealing against said rim of said flange.

9. The flange assembly of claim 8, wherein:

said sealing plug lip is grippable to remove said sealing plug from said flange.

10. The flange assembly of claim 1, wherein:

said insulative stopper is formed from a closed-cell foamed synthetic resin.

11. The flange assembly of claim 1, wherein:

said insulative stopper is of a length to extend from contact with the equipment wall to contact with said sealing plug when inserted into said access passage.

12. The flange assembly of claim 1, further including:

an extraction mechanism fitted with said insulative stopper for removal of same from said access passage.

13. The flange assembly of claim 1, wherein:

said mounting means comprises a mounting strap connected at first and second opposite ends to said flange and extending about the insulative covering.

14. The flange assembly of claim 13, wherein:

said flange has an outwardly extending rim formed thereon with receiving slots formed in it for connection with said first and second opposite ends of said strap.

15. The flange assembly of claim 13, wherein said mounting means also comprises:

releasable connectors for securing said first and second opposite ends of said mounting strap in compression on the equipment.

16. The flange assembly of claim 1, wherein:
said flange has an outwardly extending rim formed thereon with openings formed therein for passage of connectors for attaching said flange to the insulative covering.

17. The flange assembly of claim 1, wherein:
said tubular saddle has a lower surface conforming to the wall surface of the equipment.

* * * * *